Aug. 25, 1953     E. McP. LEYTON     2,650,335
SYNCHRONIZING OF AN INDUCTION MOTOR
Filed April 4, 1950

Inventor
ERIC McPHAIL LEYTON
By Ralph E. Atherton
Attorney

Patented Aug. 25, 1953

2,650,335

UNITED STATES PATENT OFFICE 2,650,335

SYNCHRONIZING OF AN INDUCTION MOTOR

Eric McPhail Leyton, London, England, assignor to Electric & Musical Industries Limited, Hayes, Middlesex, England, a British company Application April 4, 1950, Serial No. 153,906
In Great Britain April 8, 1949

8 Claims. (Cl. 318—197)

This invention relates to the synchronizing of an electric induction motor having a wound rotor and stator, at least one of which is polyphase wound.

The object of the invention is to provide means for obtaining synchronization in arrangements wherein the main power supply for the motor is derived from a source providing current at a frequency different from the frequency with which the motor is to be synchronized.

According to the invention an induction motor having a wound rotor and stator, at least one of which is polyphase wound, is provided with means for applying to the polyphase wound rotor or stator a polyphase current at a frequency which is the difference between the source frequency and the frequency with which the motor is to be synchronized.

The invention may be applied for example to apparatus for televising films wherein it is desired to synchronize the film scanning apparatus with the frame frequency of the television apparatus, this frequency sometimes being different from the frequency of the source by which the motor employed for driving the film scanning apparatus is energised. It may also be applied to the synchronism of a rotatable color filter employed in a color television receiver with a frequency corresponding to the angular frequency of a color filter at the transmitter.

Another application of the invention is to servo mechanisms wherein it is desired that the angularly movable part of a motor shall take up angular positions corresponding to the angular positions of a control member.

The said polyphase current may be derived from the current supplied by said source by means of suitable modulating devices to which the current from said source is applied in suitably spaced phase relationship and to which current at the synchronizing frequency is also applied so that the combined outputs of the modulators comprise a polyphase current at the difference frequency to be applied to the rotor or stator windings.

Figure 1:
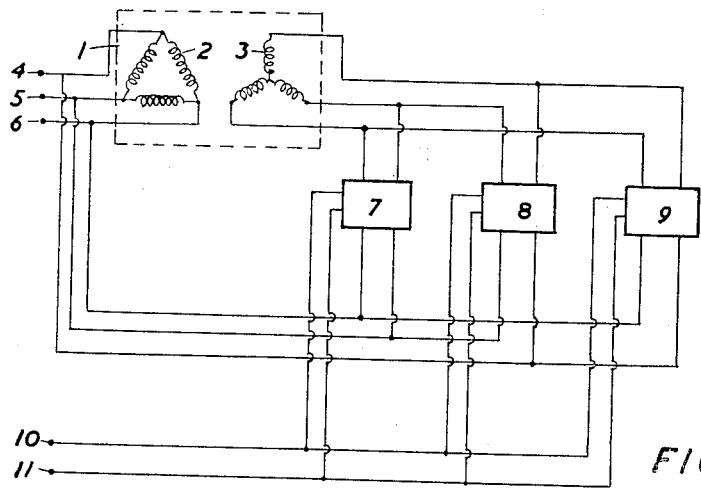
Figure 2:
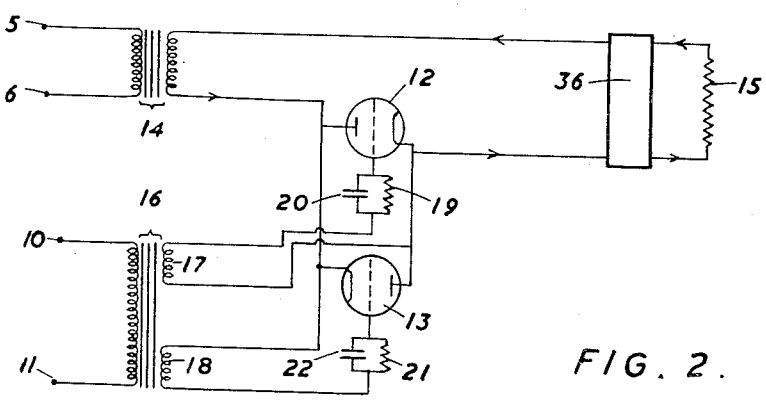
Figure 3:
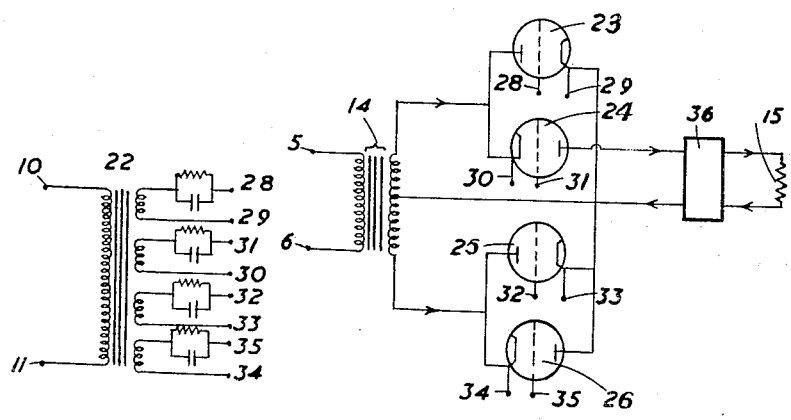

In order that the said invention may be clearly understood and readily carried into effect, the same will now be more fully described with reference to the accompanying drawing in which:

Figure 1 illustrates diagrammatically one arrangement according to the invention, and Figures 2 and 3 illustrate two forms of modulating device suitable for use in the apparatus illustrated in Figure 1.

Referring to the drawing, reference numeral 1 indicates an electric induction motor having a stator 2 and a rotor 3. The motor may additionally have a squirrel cage type of winding for facilitating starting. The stator 2 is shown as being delta connected and the rotor 3 is shown as star connected but if desired the stator may be star connected and the rotor may be delta connected or both the stator and rotor may be star or delta connected. If desired the windings need not be interconnected. The terminals 4, 5 and 6 of a three-phase mains supply are suitably connected to the stator windings and each phase of said supply is connected respectively to the input circuits of three modulators 7, 8 and 9 which are illustrated diagrammatically. The terminals 10 and 11 of a source of current at the frequency with which the motor is to be synchronized are also connected to the input circuits of each of the modulators. Thus the modulators are supplied with current at the synchronizing frequency in the same phase but the mains current is supplied to the modulators in phases which differ by 120°. The output of each modulator will therefore be a current at a frequency which is the difference between the mains frequency and the synchronizing frequency and the three modulators together provide a source of three-phase current at the said difference frequency. The output circuits of the modulators are connected to respective windings of the rotor 3. Thus the stator and rotor respectively are supplied with polyphase currents at different frequencies and it can be shown that the speed of the motor in these circumstances will be equal to the difference between these two frequencies divided by the number of pairs of poles in the motor, provided that the direction of phase rotation is correct. The difference between the two last-mentioned frequencies is however, equal to the synchronizing frequency of the current derived from terminals 10 and 11, so that the speed of the motor is equal to the synchronizing frequency divided by the number of pairs of poles.

The direction of phase rotation in the motor 1 must be arranged so that when the mains frequency is greater than the synchronizing frequency the motor runs at a speed which is lower than the speed at which it would run if energised from the mains alone in the normal manner.

The modulators 7, 8 and 9 preferably provide a sinusoidal output, thereby ensuring the same phase relation at all times between the angular position of the rotor and the phase of the synchronizing supply source.

An arrangement of this kind can be employed as a servo-mechanism for effecting remote control of the angular position of an angularly movable member. For example, if a small single-phase generator is employed as the source of synchronizing current, the motor shaft can be arranged to take up any desired angular position corresponding to the angular position of the rotatable part of the generator. By means of a suitable angularly movable control member connected to said generator, the angular position of apparatus coupled to the motor can be remotely controlled. If the output from the modulators is not sinusodial the motor will run at the correct speed but the angular position of the rotor will not necessarily be correctly related to the phase of the synchronizing current. If the output of the modulators includes direct current the copper loss in the rotor will be increased and additional slip-rings will be required on the motor shaft for correctly connecting the modulator outputs.

In a modification of the above described arrangement the mains terminals are connected directly to the rotor and the outputs of the modulators are applied to the stator windings, it being immaterial whether the rotor or stator is supplied with the modulator outputs so long as whichever of these parts is so supplied is wound in at least two phases. The other part, that is to say, the part to which the modulator outputs are not applied, may have any number of phases including one phase. It is however necessary that the number of modulators should be effectively equal to the number of phase windings in the rotor or stator as the case may be to which the modulator outputs are applied and that the number of phases in one of the currents supplied to the modulators (the mains current in the case described) should be the same as the number of modulators.

With the arrangement described nearly all the power required to drive the motor is derived from the mains supply, and nearly all the power supplied by the mains is fed to that part to which the modulator outputs are not applied. The only energy taken from the synchronizing source is that required to operate the modulators so that the invention enables an induction motor to be synchronized with a current source of low power. A standard type of induction motor may be employed and in the event of a breakdown in the synchronizing arrangement the motor may easily be run in synchronism with the mains supply. If a starting mechanism is provided the motor can be operated from a single-phase supply, the polyphase supply to the modulators being derived from the back-E. M. F. developed by the polyphase rotor or stator winding of the motor. If the motor is fitted with a damping winding, starting can be made very rapid since the motor draws the greater part of its energizing current direct from the mains and not to any great extent via the modulators.

A suitable form of modulator for use in the apparatus shown in Fig. 1 is shown in Figure 2, and comprises electron discharge tubes 12 and 13, the anode of each tube being connected to the cathode of the other tube. Assuming, that the modulator serves as the modulator 7 of Figure 1, the current from mains terminals 5, 6, is fed to the primary winding of a transformer 14, and one end of the secondary winding of transformer 14 is connected to the junction of the anode of tube 12 and the cathode of tube 13. The other end of said secondary winding is connected via resistor 15, which represents the windings of the rotor 3 of Figure 1 to which the output of the modulator is applied, to the junction of the anode of tube 13 and the cathode of the tube 12. A low pass filter 36 is provided for smoothing the output of the modulator. The current at the synchronizing frequency is fed from terminals 10 and 11 to the primary winding of a transformer 16, which has two secondary windings 17 and 18. One end of secondary winding 17 is connected to the cathode of tube 12 and the other end is connected, via a biassing resistor 19, and shunt condenser 20, to the control electrode of tube 12. One end of the secondary winding 18 is connected to the cathode of tube 12 and the other end is connected via a biassing resistor 21 and shunt condenser 22, to the control electrode of tube 13.

In operation, the magnitude of the alternating voltage at synchronizing frequency applied between the cathodes and control electrodes of the tubes 12 and 13 is preferably such that said tubes operate under Class "C" conditions. If the phases of the currents fed via transformers 14 and 16 are such that the control electrode and anode of tube 12 are positive at the same instant, tube 12 will act as a single-phase half-wave rectifier, and current will flow in the direction shown by the arrows. If the said phases differ by 180°, then the anode and control electrode of tube 13 will both become positive at the same instant and current will flow in the opposite direction to that shown by the arrows. If said phases differ by 90° then both tubes 12 and 13 will conduct equally and no current will flow in the load circuit. Thus a single phase current at the abovementioned difference frequency flows in the output circuit of the modulator, and by employing similar arrangements for each of the modulators 7, 8 and 9 of Figure 1 the combined output is a three phase current at said difference frequency.

Figure 3 shows a modulator in which four electron discharge tubes 23, 24, 25 and 26 are employed, and which has the advantages compared with the arrangement shown in Figure 2, that less smoothing is required in the filter 36 and that transformer 14 does not become polarised by load current. The anode of tube 23 is connected to the cathode of tube 24 and the anode of tube 25 is connected to the cathode of tube 26, the anode of which is connected to the cathodes of tubes 23 and 25 and to the anode of tube 24. One phase of the mains current is fed to the primary winding of transformer 14. The ends of the secondary winding of transformer 14 are connected respectively to the anode of tube 23 and the cathode of tube 24, and to the anode of tube 25 and the cathode of tube 26.

Appropriate windings of rotor 3, represented by resistor 15, are connected between the anode of tube 24 and a centre tapping on the secondary winding of transformer 14. The current of synchronizing frequency is fed to the primary winding of a transformer 27 having four secondary windings. The secondary windings are connected at one end to the respective cathodes of tubes 23, 24, 25 and 26 the other ends being connected via biassing resistors and shunt condensers to the respective control electrodes of said tubes. To avoid complication of drawing, the actual connections are not shown, it being understood that the pairs of points numbered 28, 29, 30, 31, 32, 33, 34, and 35 are connected together.

In operation, tubes 23 and 25 operate a two-phase half-wave rectifier, providing current in the direction shown by the arrows. Tubes 24 and 26 operate similarly to provide current flowing in the opposite direction.

In the arrangements shown in Figures 2 and 3 the amplitude of the outputs of the modulating devices is substantially sinusoidal with respect to the phase difference between the mains and synchronizing currents fed to the modulators, and the superimposed direct current is less than 5% of the peak output.

What I claim is:

1. Apparatus comprising an electric induction motor having two elements consisting of a wound rotor and stator, at least one of said elements being polyphase wound, mixing means, means for feeding to said mixing means current at the frequency of a main source of power supply for said motor and current at a different synchronizing frequency, means for deriving from said mixing means a polyphase current at a difference frequency which is the difference between the frequencies of said source current and said synchronizing current, means for applying to said polyphase wound element said polyphase current at said difference frequency, and means for connecting said other element to said source, whereby said motor is synchronized with current at a synchronizing frequency different from that of said source.

2. Apparatus according to claim 1 wherein said mixing means comprises a plurality of modulating devices, means for applying to said devices voltage from said source in different phases and voltage at the frequency with which said motor is to be stabilized, whereby said modulating devices together provide said polyphase current at said difference frequency.

3. Apparatus according to claim 2 wherein said modulating devices each comprises a pair of electron discharge tubes each having a control electrode, the anode of each tube being connected to the cathode of the other tube, means for applying single-phase alternating voltage at the frequency of said source to the anode of one tube and the cathode of the other tube, and means for applying voltage at said synchronising frequency to said control electrodes.

4. Apparatus according to claim 1 wherein said mixing means comprises a plurality of modulating devices, means for applying to said devices voltage from said source in different phases and voltage at the frequency with which said motor is to be stabilized, whereby said modulating devices together provide said polyphase current at said difference frequency, wherein said modulators each comprises four electron discharge tubes each having a control electrode, the anode of a first tube being connected to the cathode of a second tube, and the cathode of said first tube being connected to the cathode of a third tube and the anode of a fourth tube, and the cathode of said fourth tube being connected to the anode of said third tube, means for applying voltage at said source frequency in one phase between the anode and cathode of said first tube and in opposite phase between the anode and cathode of said third tube, and means for applying voltage at said synchronising frequency to said control electrodes.

5. Apparatus comprising an electric induction motor having two elements consisting of a wound rotor and stator, at least one of said elements being polyphase wound, mixing means, means for feeding to said mixing means current at the frequency of a main source of power supply for said motor and current at a different synchronizing frequency, means for deriving from said mixing means a polyphase sinusoidal currrent at a difference frequency which is the difference between the frequencies of said source current and said synchronizing current, means for applying to said ployphase wound element said polyphase current at said sinusoidal difference frequency, and means for connecting said other element to said source, whereby said motor is synchronized with current at a synchronizing frequency different from that of said source.

6. Apparatus according to claim 5 wherein said mixing means comprises a plurality of modulating devices, means for applying to said devices voltage in different phases from said source and voltage at the frequency with which said motor is to be stabilized, whereby said modulating devices together provide said sinusoidal polyphase current at said difference frequency.

7. Apparatus according to claim 6, said modulating devices each comprising a pair of electron discharge tubes each having a control electrode and an anode and cathode, the anode of each tube being connected to the cathode of the other tube, means for applying single-phase alternating voltage at the frequency of said source to the anode of one tube and the cathode of the other tube, and means for applying voltage at said synchronizing frequency to said control electrodes.

8. Apparatus according to claim 5 wherein said mixing means comprises a plurality of modulating devices, means for applying to said devices voltage in different phases from said source and voltage at the frequency with which said motor is to be stabilized, whereby said modulating devices together provide said polyphase current at said difference frequency, said modulators each comprising four electron discharge tubes each having a control electrode and an anode and cathode, the anode of a first tube being connected to the cathode of a second tube, and the cathode of said first tube being connected to the cathode of a third tube and the anode of a fourth tube, and the cathode of said fourth tube being connected to the anode of said third tube, means for applying voltage at said source frequency in one phase between the anode and cathode of said first tube and in opposite phase between the anode and cathode of said third tube, and means for applying voltage at said synchronizing frequency to said control electrodes.

ERIC McPHAIL LEYTON.

References Cited in the file of this patent

UNITED STATES PATENTS

| Number | Name | Date |
| --- | --- | --- |
| 1,450,340 | Smith et al. | Apr. 3, 1923 |
| 1,481,317 | Hellmund | Jan. 22, 1924 |
| 1,655,042 | Alexanderson | Jan. 3, 1928 |